United States Patent
Chu et al.

(12)

(10) Patent No.: US 6,421,375 B1
(45) Date of Patent: Jul. 16, 2002

(54) METHOD AND APPARATUS FOR TRANSMITTING CONTROL SIGNALS IN A DATA COMMUNICATION SYSTEM HAVING A FULLY DIGITAL COMMUNICATION CHANNEL

(75) Inventors: Keith Chu, Laguna Niguel, CA (US); Sverrir Olafsson, Reykjavik (IS)

(73) Assignee: Conexant Systems, INC, Newport Beach, CA (US)

( * ) Notice: Subject to any disclaimer, the term of this patent is extended or adjusted under 35 U.S.C. 154(b) by 0 days.

(21) Appl. No.: 09/123,599

(22) Filed: Jul. 28, 1998

(51) Int. Cl.[7] ............................... H04B 1/38; H04L 5/16
(52) U.S. Cl. ....................................... 375/222; 370/522
(58) Field of Search ................................. 375/222, 223, 375/224, 220, 212; 370/522, 523

(56) References Cited

U.S. PATENT DOCUMENTS

| | | | | | |
|---|---|---|---|---|---|
| 4,780,883 A | * | 10/1988 | O'Connor et al. | ............. | 375/7 |
| 4,833,675 A | * | 5/1989 | Hekimian et al. | | |
| 4,893,305 A | * | 1/1990 | Fernandez et al. | ............. | 370/84 |
| 4,937,844 A | * | 6/1990 | Kao | ............................ | 375/122 |
| 5,140,584 A | * | 8/1992 | Suzuki | ........................ | 370/60 |
| 5,633,632 A | * | 5/1997 | Ido et al. | ........................ | 341/58 |
| 5,892,802 A | * | 4/1999 | Jung et al. | ................... | 375/354 |
| 6,084,883 A | * | 7/2000 | Norell et al. | ................ | 370/420 |
| 6,154,469 A | * | 11/2000 | Boyer et al. | ................ | 370/528 |
| 6,188,720 B1 | * | 2/2001 | Batzer et al. | ................ | 375/222 |

* cited by examiner

Primary Examiner—Jean Corrielus
(74) Attorney, Agent, or Firm—Farjami & Farjami LLP

(57) ABSTRACT

A modem system having two modem devices digitally connected to a digital telephone network includes an inband control signal channel. The inband control signal channel is formed by using the most significant bit position of every sixth transmitted codeword for the transmission of control data. The control signal includes a predetermined header section that is monitored by the receiving modem to maintain frame synchronization and to correct for digital frame slippage. The control signal also includes a number of control data packets that contain information related to the initiation of control procedures such as rate renegotiations and retraining requests. The disclosed inband transmission techniques may additionally (or alternatively) be utilized to define a secondary data channel.

22 Claims, 5 Drawing Sheets

Figure 3. Timing Diagram for the Digital Connection Detection

METHOD AND APPARATUS FOR TRANSMITTING CONTROL SIGNALS IN A DATA COMMUNICATION SYSTEM HAVING A FULLY DIGITAL COMMUNICATION CHANNEL

FIELD OF THE INVENTION

The present invention relates generally to data communication systems such as modem systems. More particularly, the present invention relates to the transmission of inband control signals between two modem devices having a fully digital data communication channel established therebetween.

BACKGROUND OF THE INVENTION

Current modem systems are now capable of data transmission at speeds of up to 56 kilobits/second (kbps). The ITU-T Recommendation V.90 (the international standard for 56 kbps modems) currently applies to a modem system in which one modem, e.g., an internet service provider server modem, is digitally connected to the telephone network and the corresponding modem, e.g., a modem located at an end user's personal computer, is connected to the telephone network via an analog loop. V.90 modem systems utilize pulse code modulation (PCM) techniques to accomplish the relatively high data rates that approach 56 kbps.

Although current V.90 modem systems may be suitable for most internet applications that only need to be capable of handling heavy downstream data traffic, there are some applications that can exploit the high bidirectional data rates that can be supported by a fully digital system. For example, a PBX system may include two digital modems associated with two remote end users and a fully digital communication channel defined between the modems. Similarly, it may be desirable to have two V.90 compliant server modems, each digitally connected to a telephone network, communicate with one another absent an intervening connection to an analog client modem. As another example, a digital PCM server modem can be connected to a Basic Rate ISDN modem. In such situations, it would be practical to leverage the existing encoding and other techniques utilized by digital V.90 modems to implement an effective all-digital communication channel.

While current V.90 modem systems are suitable for many applications where a relatively high downstream data rate (compared to the upstream data rate) is desired, some of the V.90 protocols may not be suitable or optimized for operation in an all-digital environment. Furthermore, assuming that an all-digital high speed modem system can be implemented, each of the digital modem devices should also be compatible with V.90 for purposes of establishing a communication session with an analog modem device. Accordingly, it would be desirable for each of the individual modem devices to be capable of determining whether or not a fully digital channel is present for a given communication session.

Conventional analog modem systems (and conventional V.90 modem systems) rely upon tonal or spectral techniques to initiate retraining, rate renegotiations, and other control procedures. Unfortunately, such techniques may not lead to optimal results in a fully digital operating mode (e.g., where both modem devices are digitally connected to a digital telephone network and no intervening analog processing is present within the communication channel) because the transmitted data has random characteristics and need not have any specifically encoded analog content. Furthermore, if tonal indicators are utilized, then actual data transmitted during a fully digital mode may be mistaken for such tonal indicators by the modem system. Accordingly, tonal or spectral indicators would not produce a robust and reliable inband control mechanism.

SUMMARY OF THE INVENTION

Accordingly, it is an advantage of the present invention that an improved control signal technique is provided for application in a fully digital data communication system.

Another advantage of the present invention is that it enables the calling and answer modems in a modem system to determine whether a fully digital communication channel has been established.

Another advantage of the present invention is that it provides a robust inband digital control channel that can be easily implemented by leveraging existing V.90 digital modem technology.

A further advantage is that the inband digital control technique can be utilized to facilitate the monitoring and maintenance of digital frame synchronization during the transmission of data.

Another advantage of the present invention is that the inband control channel may be employed to initiate modem functions such as retraining, rate renegotiations, and clear downs, and to detect signal loss.

The above and other advantages of the present invention may be carried out in one form by a data communication method for providing control signals between a first modem device and a second modem device operatively coupled together with a fully digital communication channel established therebetween. Such a method may include the steps of establishing a communication session between the first and second modem devices, executing, during the communication session, an inband signaling routine between the first and second modem devices, and conducting a control procedure during the communication session. The particular control procedure and the initiation of the control procedure is performed in response to a control signal associated with the inband signaling routine.

BRIEF DESCRIPTION OF THE FIGURES

A more complete understanding of the present invention may be derived by referring to the detailed description and claims when considered in connection with the Figures, where like reference numbers refer to similar elements throughout the Figures, and:

DETAILED DESCRIPTION OF A PREFERRED EXEMPLARY EMBODIMENT

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, look-up tables, and the like, which may carry out a variety of functions under the control of one or more microprocessors or other control devices. In addition, those skilled in the art will appreciate that the present invention may be practiced in any number of data communication contexts and that the modem system described herein is merely one exemplary application for the invention. Further, it should be noted that the present invention may employ any number of conventional techniques for data transmission, control signaling, signal processing and conditioning, and the like. Such general techniques that may be known to those skilled in the art are not described in detail herein.

A typical 56 kbps PCM modem connection may be established between a digital modem associated with an internet service provider and an analog modem associated with an end user. In such an environment, the digital modem is digitally connected to the telephone network while the analog modem is connected to the telephone network through an analog loop. In contrast, the techniques of the present invention are suitable for a fully digital environment where the communication channel between the two modems is fully digital. Such a situation may arise when one digital sever modem communicates with another digital server modem. Those skilled in the art will recognize that a fully digital connection facilitates high speed bidirectional data communication.

Figure 1:
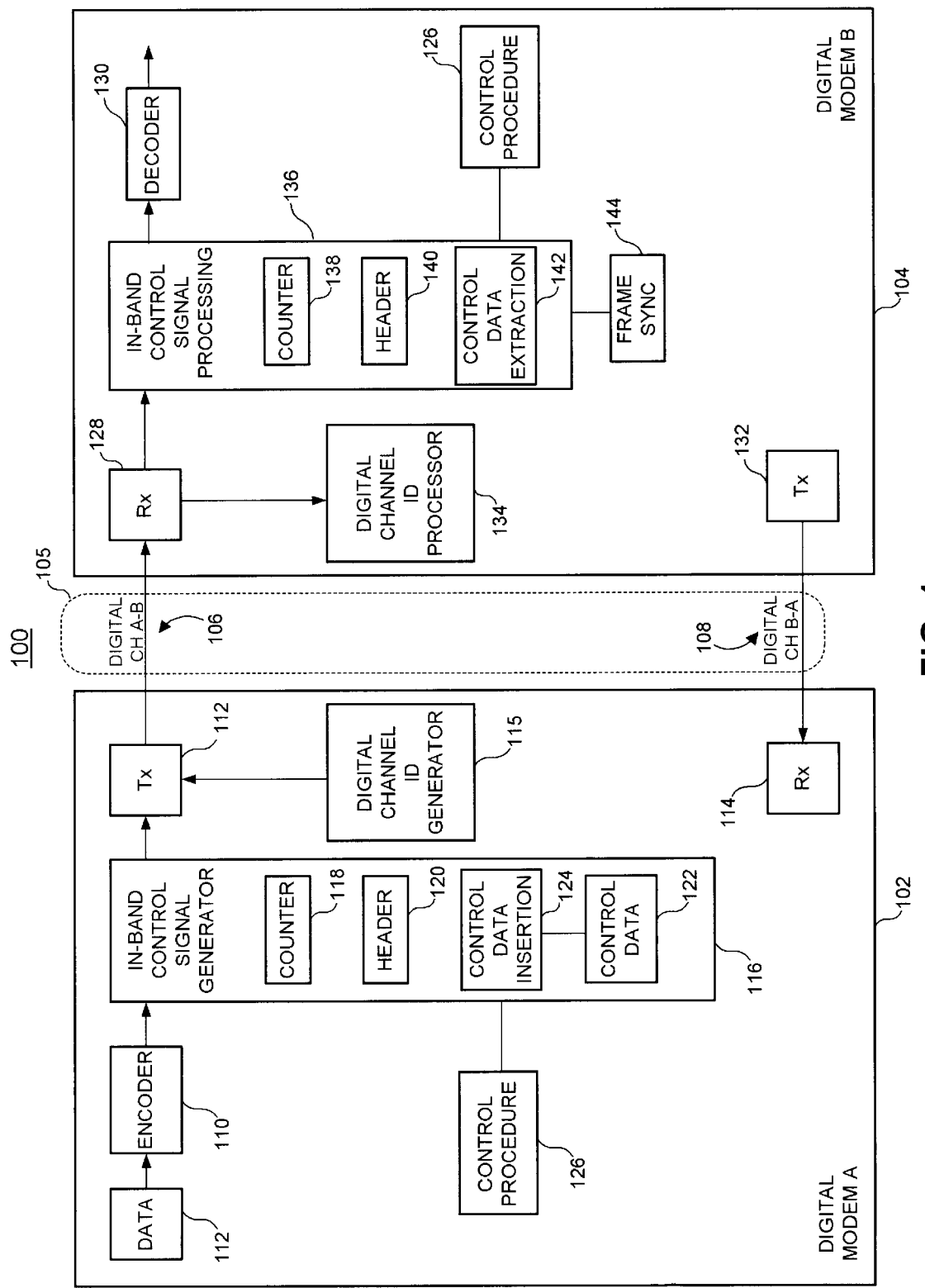
FIG. 1 is a block diagram representation of an exemplary modem system configured in accordance with the present invention.

A block diagram depiction of an exemplary PCM modem system 100 that may incorporate the principles of the present invention is shown in FIG. 1. It should be appreciated that the particular implementation shown in FIG. 1 and described herein is merely exemplary and is not intended to limit the scope of the present invention in any way. Indeed, for the sake of brevity, conventional timing recovery, automatic gain control (AGC), synchronization, training, and other functional aspects of modem system 100 are not described in detail herein. Furthermore, the connecting lines shown in FIG. 1 are intended to represent exemplary functional relationships and/or physical couplings between the various elements. Those skilled in the art will recognize that many alternative or additional functional relationships or physical connections may be present in a practical modem system.

Generally, modem system 100 includes a first modem, e.g., modem 102, and a second modem, e.g., modem 104. Modems 102, 104 are generally configured in accordance with known principles to communicate over the public switched telephone network (PSTN) 105 via at least one communication channel, e.g., channels 106, 108. (Alternatively, modems 102, 104 may be configured to communicate with each other via a fully digital PBX system). In the context of this description, channels 106, 108 may be digital channels and, therefore, the transmission path between modems 102, 104 may be fully digital.

Although not shown in FIG. 1, each of modems 102, 104 may include a suitable processor configured to carry out various tasks associated with the operation of modem system 100. Indeed, modem system 100 may incorporate any number of processors or control elements as necessary to support its operation. Such processors or control elements may suitably interact with other functional components of modems 102, 104 to thereby access and manipulate data or monitor and regulate the operation of modem system 100.

First modem 102 preferably includes an encoder 110 configured to encode digital data 112 in accordance with the particular encoding protocol employed by modem system 100. For example, multiple modulus conversion mapping and μ-law or A-law signal point assignments may be used in conventional modem systems in accordance with various known and proprietary techniques. The output signal generated by encoder 110 may include information for transmission during a data mode, synchronization or training signals for transmission during an initialization mode, or control or other signaling data employed by modem system 100.

Modem 102 includes a transmitter 112, which is configured to transmit encoded symbols in accordance with general PCM techniques (e.g., in V.90 systems, universal PCM codewords are transmitted). Such symbols or codewords may include data, training signals, synchronization signals, control signals, and the like. Modem 102 also includes a receiver 114, which is preferably configured in accordance with conventional modem technologies. Receiver 114 is configured to receive data from modem 104; such data may include encoded information bits, control signals, functional parameters or identifiers, and any other data employed by conventional modem systems. For example, and as described in more detail below, modem 104 may be configured to send information indicative of its digital capabilities to modem 102 to enable modem system 100 to determine whether a fully digital connection is present. A decoder (not shown) resident at modem 102 may be used to decode any signals transmitted from modem 104 to modem 102.

In the preferred embodiment, modem 102 includes a digital channel identification (CID) generator 115. As described in more detail below, CID generator 115 is configured to generate a suitably formatted CID sequence for transmission over channel 106 while the communication channel is being initialized. For example, the CID sequence may be transmitted during the handshaking procedures set forth in ITU-T Recommendation V.8. To this end, CID generator 115 selects the particular data or codewords to be transmitted, and indicates the appropriate time during which the CID sequence is to be generated. CID generator 115 may include any number of processing or memory elements (not shown) configured to support its functionality.

The CID sequence is preferably configured to enable modem 104 to determine whether channel 106 is fully digital. If channel 106 is fully digital, then the CID sequence can be extracted from the signal received by modem 104 and compared to a predetermined CID sequence stored at modem 104. However, if channel 106 includes some analog processing elements, then the CID sequence will not be successfully extracted by modem 104. Accordingly, the transmission of the CID sequence enables modem system 100 to determine whether to enter a fully digital data mode.

Modem 102 may also include an inband control signal generator 116. Control signal generator 116 is suitably configured to carry out a number of processes related to an inband digital control signaling routine supported by modem system 100. In the context of the present invention, the inband digital control signaling routine is performed when the communication channels 106, 108 are fully digital in nature. In addition to the specific functional elements described herein, control signal generator 116 may include any number of suitable processing or memory elements.

Control signal generator 116 preferably includes (or is functionally associated with) a counter 118. Counter 118 may be configured to count PCM codewords, data symbols, data frames, bits, or any suitable incremental amount of digital data during transmission. In the context of the preferred embodiment, counter 118 suitably counts the 8-bit universal PCM codewords that are transmitted by modem 102 (the use of universal PCM codewords is mandated by ITU-T Recommendation V.90). Counter 118 is desirable to enable modem 102 to transmit inband digital control data at specifically designated times during the communication session. In the preferred embodiment, counter 118 counts every sixth PCM codeword; one practical embodiment utilizes a modulo-6 counting element for counter 118.

Control signal generator 116 may also include or be associated with a predetermined header sequence 120. Those skilled in the art will appreciate that the particular header sequence 120 may be formatted in response to one or more operating parameters or features of modem system 100. Furthermore, header sequence 120 may be rigidly programmed into modems 102, 104 or designed in an adaptive manner in response to an initialization routine performed by modem system 100. As described in more detail below, header sequence 120 may be employed to enable modem 104 to monitor frame synchronization and, preferably, to initiate suitable corrective measures in response to the detection of digital frame slippage. The length of header sequence 120 relates to the granularity of the frame slippage detection. For instance, if the header is very long, then the time required to detect frame slippage may be excessive; if the header is too short, then the sequence may emulate transmitted data.

Control signal generator 116 is preferably configured to access control data 122 as necessary to carry out the inband digital control signal techniques of the present invention. In the context of this description, control data 122 may be associated with any number of control requests (e.g., to initiate retraining, rate renegotiation, or clear down procedures), diagnostic communications, or any type of data or messages utilized by modem system 100 for monitoring, regulating, or controlling its operation. The specific digital data associated with control data 122 may vary from application to application, and certain types of predetermined control data 122 may be stored at modem 102.

As described above, counter 118 is preferably configured to count PCM codewords in a periodic manner to enable the transmission of inband digital control data. Accordingly, control signal generator 116 may include a control data insertion element 124, which is configured to insert control data 122 into specific symbols for transmission to modem 104. In the preferred exemplary embodiment, control data insertion element 124 is configured to utilize the most significant bit (MSB) position from every sixth codeword for use with inband digital control data. In other words, rather than having eight bits of data transmitted in each codeword, every sixth codeword contains seven bits of data and one bit of control data. Consequently, in a practical digital-to-digital modem system that transmits data at 64 kbps (8 bits/symbol transmitted at 8000 symbols/second), this inband digital control signal scheme utilizes only 8/6 kbps (leaving an effective maximum user data rate of 62.67 kbps).

Modem 102 (and modem 104) may also include any number of processing or memory elements associated with one or more control procedures 126. In the preferred embodiment, control data 122 may be formatted as a marker to initiate a control procedure such as retraining, rate renegotiation, or clear down. Assuming modem 104 properly receives inband digital control data 122, then an associated control procedure 126 may be carried out in accordance with its specific functional protocols. Accordingly, the specific control procedure 126 may be responsive to one or more inband digital control signals transmitted by modem 102. Indeed, the inband digital control data 122 may identify which control procedures 126 are to be performed and when such control procedures 126 are to be carried out. Modem system 100 may cooperate with any number of conventional control procedures associated with known methodologies.

With continued reference to FIG. 1, signals transmitted to modem 104 over channel 106 are received by a receiver 128. It should be noted that receiver 128 may include any number of additional components (that may be known in the art) for equalization, conditioning, or other processing of the received signal. Modem 104 processes received data signals to obtain the original digital data encoded by modem 102; modem 104 includes a decoder 130 to suitably decode the received symbols in accordance with the same encoding scheme employed by encoder 110.

A transmitter 132 is preferably utilized to send data and control information to modem 102. The data transmitted by transmitter 132 may be encoded prior to transmission over PSTN 105. It should be appreciated that modem system 100 is preferably a bidirectional system; the various elements described above in connection with modem 102 may also be present in modem 104 for purposes of transmission over channel 108. Thus, a CID sequence may be transmitted from modem 104 to modem 102 during the same V.8 initialization period and a number of inband digital control signals may be transmitted concurrently over channels 106, 108.

Modem 104 preferably includes a digital channel identification (CID) processor 134, which performs various tasks associated with the detection and analysis of the CID sequence generated by modem 102. In the preferred embodiment, CID processor 134 is configured to operate in a manner that is compatible with CID generator 115. In other words, CID processor 134 extracts the CID sequence in accordance with the protocol under which the CID sequence was generated by CID generator 115. After extracting the digital data that theoretically represents the CID sequence, CID processor 134 compares the data to a predetermined CID sequence. In this manner, CID processor 134 may be suitably configured to determine whether the CID sequence has been received by modem 104 and, if a fully digital connection is confirmed, to initiate a fully digital operating mode for modem 104.

Modem 104 may also include an inband control signal processor 136. Control signal processor 136 is suitably configured to carry out a number of processes related to the inband digital control signal routine described above in connection with modem 102. As with control signal generator 116, control signal processor 136 may include any number of suitable processing or memory elements.

Control signal processor 136 preferably includes (or is functionally associated with) a counter 138, which functions like counter 118 to count PCM codewords, data symbols, data frames, bits, or any suitable incremental amount of digital data during transmission. Counter 118 is preferably aligned or synchronized with counter 138 during an initialization period associated with modem system 100. As with counter 118, counter 138 preferably counts every sixth PCM codeword; one practical embodiment utilizes a modulo-6 counting element for counter 138. Those skilled in the art will appreciate that, because V.90 modem systems are required to transmit data in six-symbol segments, the implementation of counters 118, 138 can be relatively straightforward in a practical modem system that leverages existing V.90 technology.

Control signal processor 136 may also include or be associated with a predetermined header sequence 140, which, in the preferred embodiment, corresponds with header sequence 120. In an alternate embodiment, a number of different headers may be utilized by modem system 100 to indicate different operating parameters or to enable the execution of any number of application-specific control procedures. Control signal processor 136 may access header sequence 140 for comparison with a digital sequence extracted from a signal received by modem 104 or for purposes of monitoring and regulating frame synchronization.

Control signal processor 136 preferably includes a control data extraction element 142. Extraction element 142 is configured to extract inband digital control data 122 that may be transmitted by modem 102 in the manner described above. Extraction element 142 is suitably configured to reverse the operation performed by control data insertion element 124 to thereby recover the associated control signal. In the context of the exemplary embodiment described herein, extraction element 142 is configured to extract the digital data contained in the MSB position of every sixth codeword. Accordingly, extraction element 142 operates in conjunction with counter 138. Once the appropriate control data is extracted, control signal processor 136 analyzes and processes the control data in an appropriate manner, e.g., by initiating and/or performing a suitable control procedure 126 (described above in connection with modem 102).

Modem 104 may include a frame synchronization element 144 configured to carry out various processes associated with the monitoring and maintenance of synchronization between modems 102, 104. As mentioned above, a predetermined header sequence may be utilized to enable modem 104 to verify whether digital frame slippage has occurred. In accordance with one aspect of the present invention, a unique header sequence is employed for each channel 106, 108; thus, frame slippage can be independently detected and corrected by the respective modems 102, 104. Loss of frame synchronization can be corrected by correlating the received header sequence data and adjusting the timing as necessary. Such predictive techniques may be an efficient alternative to complete retraining procedures.

The above techniques may also be utilized to provide modem system 100 with a secondary data channel for a number of applications such as error control, network management, tunneled AT commands, internet access, and remote diagnostics. Allowing the end users to have access to the secondary data channel (in lieu of or in addition to the inband digital control channel) is an effective allocation of resources that does not considerably reduce the digital data rate associated with the primary data channel.

Figure 2:
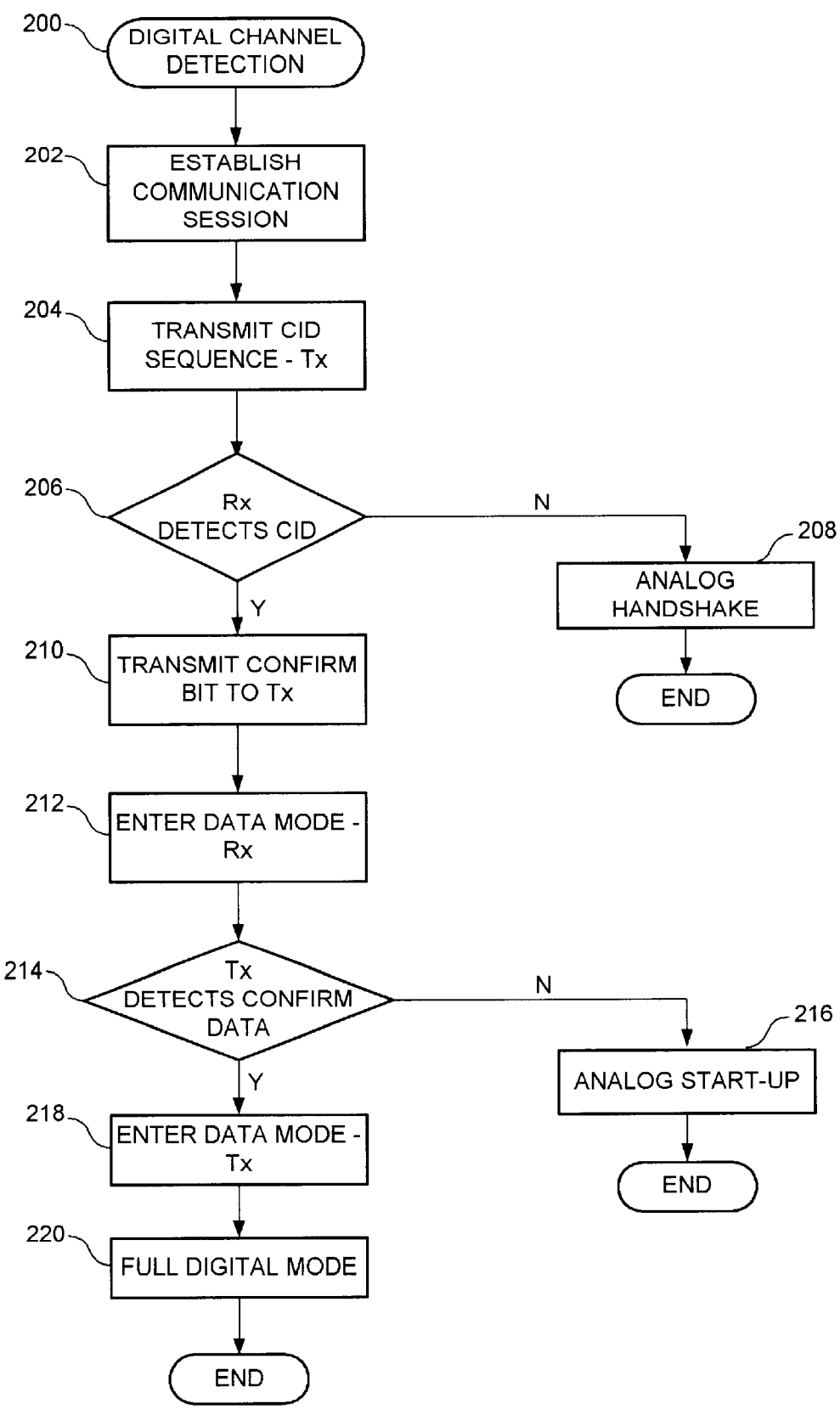
FIG. 2 is a flow diagram of a digital connection detection process that may be performed by the modem system shown in FIG. 1.

FIG. 2 is a flow diagram of a digital connection detection process 200 that may be performed by modem system 100 during an initialization procedure. Process 200 may be performed to enable modem system 100 to determine whether a fully digital connection has been established between modems 102, 104. In other words, modem 104 receives PCM codewords at the rate of 8,000 codewords/second; no digital-to-analog or analog-to-digital conversion elements are associated with the communication channel. For purposes of this description, process 200 assumes that modems 102, 104 are each capable of determining whether or not it is an analog or digital modem. Of course, process 200 may be suitably modified if this assumption is not valid.

Process 200 preferably begins with a task 202, which establishes a communication session between modems 102, 104. Task 202 may be associated with an initialization protocol such as ITU-T Recommendation V.8 and/or V.8bis. During a task 204, modem 102 preferably transmits the CID sequence (described above in connection with FIG. 1). Task 204 may be performed during the beginning portion of the V.8 Phase 1 handshake, after modem 102 transmits the Call Identifier (CI) data and while modem 102 is receiving the "ANSam" signal from modem 104 (see the exemplary signal timing diagram of FIG. 3). In the preferred embodiment, the CID sequence is a relatively low level signal that mimics the transmission of analog silence.

In an exemplary embodiment, the CID sequence is formed from a plurality of PCM codewords that are positive and negative. The CID sequence is preferably configured such that its signal power (as seen at the output of a line card digital-to-analog converter) is less than −48 dBm. Moreover, because the CID sequence is transmitted during the silence period of modem 102, the length of the CID sequence is between 4,000 symbols (corresponding to 500 ms of silence) and 8,000 symbols (corresponding to 1 second of silence).

In one preferred embodiment, the CID sequence performs two functions: (1) facilitating the detection of a fully digital connection; and (2) facilitating an enhanced evaluation of digital impairments. The current ITU-T Recommendation V.90 calls for the transmission of a digital line impairment (DIL) signal to enable the downstream modem to design suitable signal point constellations for use during the data mode. The CID sequence may be suitably formatted to assist in the evaluation of digital impairments or as a substitute for the V.90 DIL signal.

The CID sequence may be formatted in accordance with a number of criteria. For example, in the preferred embodiment, the sign bits associated with the transmitted codewords are encoded to conform to a self-synchronizing scrambled pattern. One exemplary scrambling algorithm is the Call Modem Generating Polynomial (GPC) as set forth in the ITU-T Recommendation V.34: $1+x^{-18}+x^{-23}$. At modem 102, the scrambler shall effectively divide the input sequence by the GPC. The coefficients of the quotients of this division, taken in descending order, form the sign bit sequence to be transmitted. For example, a pre-scrambled sign pattern of all positive ones can be inputted to the scrambler to produce the sequence of scrambled ones. Another example for the pre-scrambled pattern is a sequence of consecutive positive ones for a long period followed by 12 consecutive negative ones, followed again by a sequence of consecutive positive ones. The latter example has the advantage of allowing modem 104 to perform digital synchronization on a modulo-6 count.

The remaining seven bits of the PCM codewords are preferably selected as a random sequence that ensures that the overall signal power is less than −48 dBm. This selection is performed to preserve the sign bits of the PCM codewords where digital pads are present in the communication channel 106. Although the remaining data bits can be optionally encoded to carry out further digital evaluation functions (e.g., for evaluating digital impairments), it is not necessary to do so for the determination of whether a fully digital channel exists.

Figure 3:
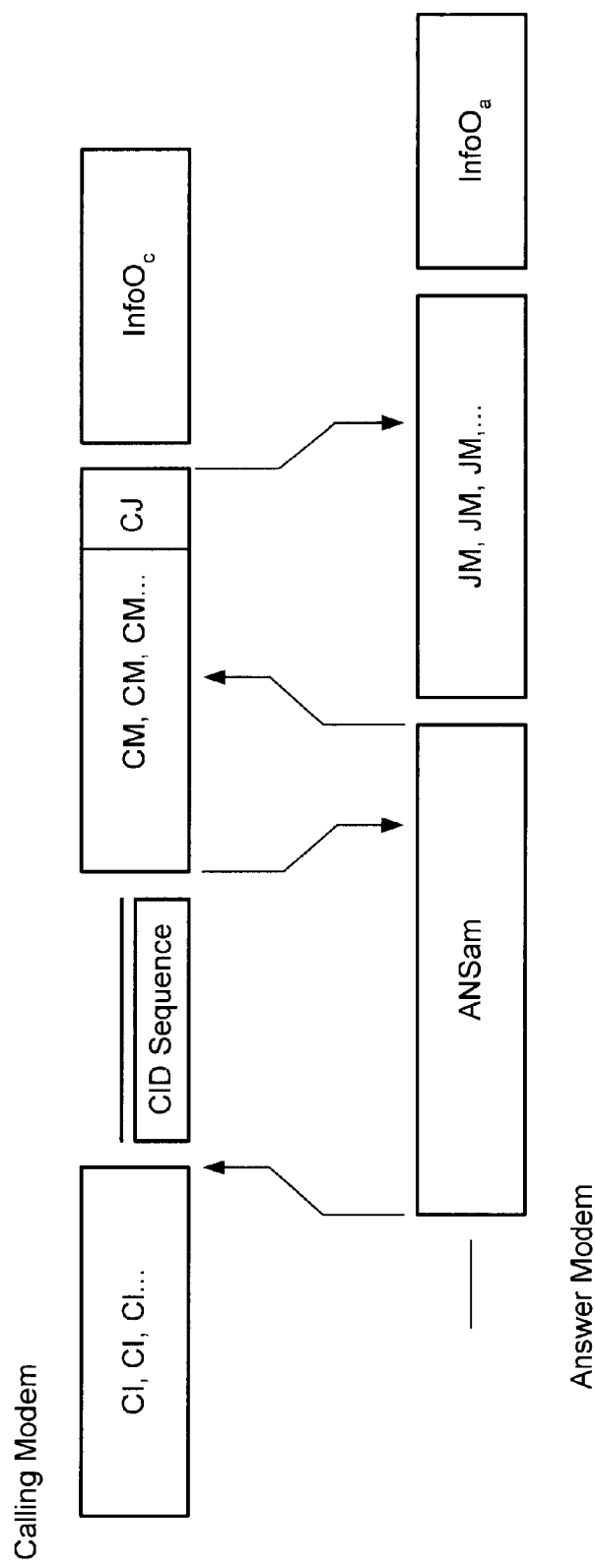
FIG. 3 is a timing diagram associated with a digital connection detection technique that may be implemented by the modem system shown in FIG. 1.

After the CID sequence has been transmitted, modem 102 preferably continues to transmit the Call Menu (CM) data as specified by the ITU-T Recommendation V.8 (see FIG. 3). In the preferred embodiment, modem 102 indicates that it is digitally connected to the telephone network via a provided bit in the Call Menu octave.

Referring again to FIG. 2, after the CID sequence is transmitted, a query task 206 may be performed to determine whether modem 104 has detected the CID sequence. While modem 104 is transmitting the "ANSam" signal, its receiver is conditioned to detect the CID sequence from modem 102. Because the network canceler could be enabled at the beginning of the connection, modem 104 may not be capable of detecting the CID sequence for several hundred milliseconds. However, since the CID sequence is transmitted for a minimum of 500 ms, modem 104 should have sufficient time to perform a robust detection of the CID sequence after the network canceler is disabled by the answer tone. To detect the CID sequence, modem 104 may obtain the received PCM data stream and disregard the seven non-sign bits (or otherwise extract the sign bits). The remaining sign bits can be passed through a descrambler that conforms to the same scrambling algorithm employed by modem 102. Thus, modem 104 can determine whether a pure digital connection exists by examining the output of the descrambler and comparing it to the predetermined CID sequence.

If the CID is not detected at modem 104, then a task 208 may be performed to cause modem 104 to initiate a conventional analog handshaking procedure. If the CID is detected at modem 104, then a task 210 may be performed to suitably transmit a confirmation bit to modem 102. In an exemplary embodiment, the confirmation bit is defined in the Joint Menu (JM) data transmitted by modem 104. Following transmission of the confirmation bit, modem 104 enters the digital data mode (task 212) by transmitting a modified digital connection "Info0a" sequence to modem 102.

After modem 102 has transmitted the CM data, its receiver is conditioned to detect the "JM" data from modem 104. A query task 214 may be performed to test whether modem 102 receives the appropriate confirmation data from modem 104 (e.g., the bit identifying that modem 104 is digitally connected and the confirmation bit contained in the "JM" data). If not, then a task 216 may be performed to cause modem system 100 to initiate an analog modem start-up, a V.90 modem start-up, or the like. If modem 102 receives the confirmation data, then a task 218 may be prompted to cause modem 102 to also enter the digital data mode. During task 218, modified "Info0c" sequences may be transmitted by modem 102. Following task 218, modem system 100 operates in a full digital transmission mode (task 220).

Figure 4:
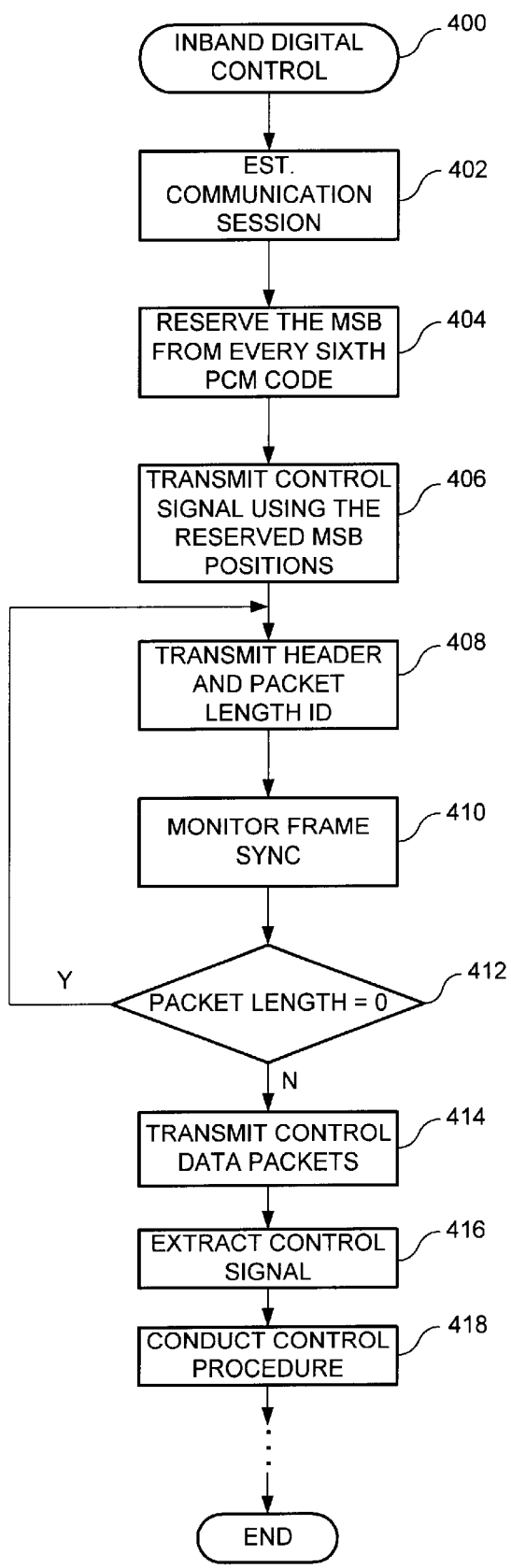
FIG. 4 is a flow diagram of an inband digital control process that may be performed by the modem system shown in FIG. 1.

FIG. 4 is a flow diagram of an exemplary inband digital control process 400 that may be performed by modem system 100. Process 400 is preferably performed when a fully digital communication channel is established between modems 102, 104. Accordingly, process 400 may be performed after process 200 determines that modem system 100 can operate in a fully digital data mode.

Process 400 begins with a task 402, which establishes a communication session between modems 102, 104. In the context of process 400, this communication session is associated with a full digital connection. A task 404 may be performed to initiate the formatting of the inband digital control signal. Specifically, task 404 reserves or allocates the MSB position from every sixth PCM codeword that is to be transmitted by modem 102. As described above, although the preferred embodiment transmits codewords having eight bits, the present invention is not limited to any particular codeword length. Furthermore, although the MSB position is a convenient bit position to use in the context of current modem systems, task 404 may reserve any consistent bit position associated with periodic codewords.

Figure 5:
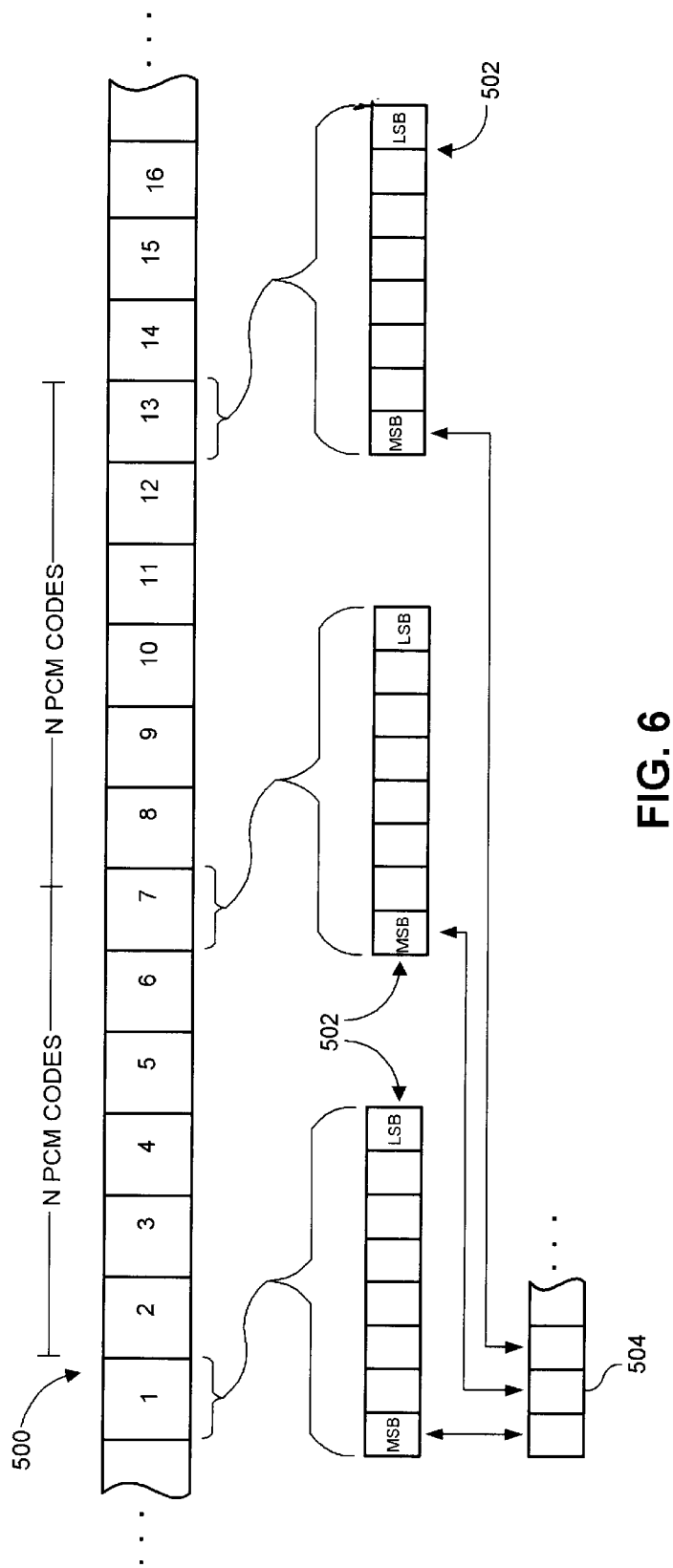
FIG. 5 is a schematic representation of a number of transmitted pulse code modulation (PCM) codes, along with a preferred inband digital control signal format and its relationship to the PCM codes.

A task 406 is performed to facilitate the transmission of the inband digital control signal using the reserved MSB positions. In other words, modem 102 preferably inserts digital control data in the MSB position of every sixth codeword that is transmitted. FIG. 5 is a schematic representation of how a typical inband digital control signal is formatted in accordance with this technique. A number of PCM codewords 500 are depicted in numerical order of transmission by modem 102. As shown, certain PCM codewords 500 are identified in a periodic manner; for the exemplary embodiment described herein the relevant period (N) is six. Accordingly, every sixth PCM codeword 500 is employed for the transmission of inband control data.

Each of the individual PCM codewords 500 is shown broken out into a corresponding 8-bit word 502. As stated above, alternative systems may employ codewords having any number of bits (B). In the preferred embodiment, the MSB position (which is used for the sign bit in V.90 modem systems) is utilized for the transmission of the inband digital control data 504. Accordingly, for every sixth PCM codeword, there are seven bits of transmitted data and one bit associated with the control data 504. The inband digital signaling routine is particularly desirable because it is substantially resistant to the effects of digital impairments present within the communication channels 106, 108. In particular, because robbed bit signaling affects the least significant bits, the use of the MSB position for the transmission of control data is immune to robbed bit signaling. Furthermore, digital pads typically do not affect the MSB (or sign bit) of the 8-bit codewords because the associated amplitude division operations do not affect the sign of the codewords.

Figure 6:
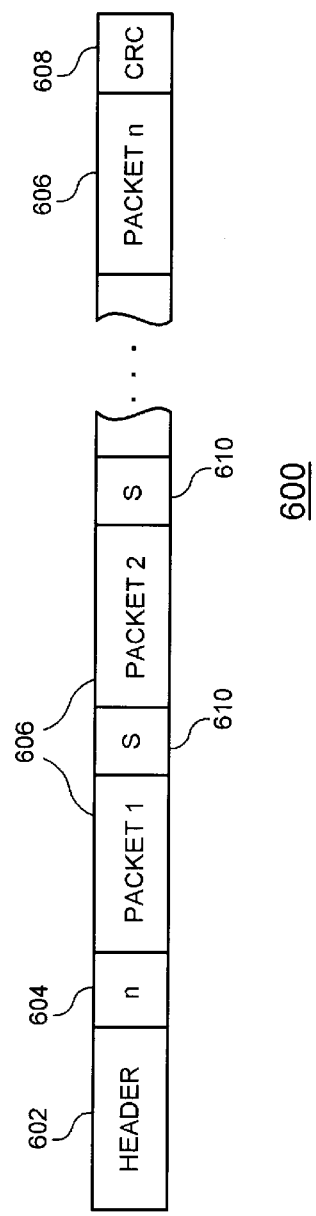
FIG. 6 is a schematic representation of an exemplary inband digital control signal format.

Referring back to FIG. 4, a task 408 may be performed to transmit a predetermined header sequence and a packet length identifier as inband digital control data. FIG. 6 is a schematic representation of an exemplary inband digital control signal format 600 suitable for use with modem system 100. As shown, a particular control signal may include a header 602 (as described above in connection with FIG. 1), a packet length identifier 604, a number of packets 606, and a cyclic redundancy check (CRC) segment 608. The control signal format 600 may also include a number of stop/start bits 610 that divide packets 606. Packet length identifier 604 defines the number of data packets 606 that are to follow with respect to the current control signal. Packet length identifier 604 may define any number suitable for the specific application (including zero, which indicates that no control data is to follow). In an exemplary embodiment, each packet 606 is sixteen bits long, and all stop/start bits 610 are defined to be zero. CRC segment 608 may be formatted in accordance with conventional error checking techniques.

Task 408 transmits header 602 and packet length identifier 604 periodically during the digital mode. Accordingly, a task 410 may be performed by modem 104 to suitably monitor frame synchronization relative to modem 102. During task 410, modem 104 may compare each received header 602 with a predetermined header sequence to verify that frame slippage has not occurred. Alternatively, modem 104 may use predictive techniques to anticipate whether frame slippage has occurred and, if so, to adjust the timing in a suitable manner. It should be noted that task 410 may be performed at any suitable time during the digital data mode.

A query task 412 may be performed to determine whether packet length indicator 604 is equal to zero. If so, then process 400 may be re-entered at task 408 to repeat the transmission of the header and the next packet length identifier 604 as part of the inband control signal. If packet length identifier 604 defines a nonzero number, then a task 414 may be prompted. Task 414 causes modem 102 to format and transmit a number (n) of data packets 606 associated with the current inband digital control data. For example, if modem 102 deems it necessary to initiate a rate renegotiation, then the number of data packets 606 will be dictated by the amount of information required to properly signal to modem 104 that a rate renegotiation is to be performed. Accordingly, packet length identifier 604 also serves to provide modem 104 with information related to the amount of data it will be receiving.

A task 416 is preferably performed by modem 104 to suitably extract the control signal data from the associated data packets 606. Of course, the same extraction technique may be employed to derive header sequence 602 and packet length identifier 604 from the transmitted PCM codewords. The extraction procedure performed during task 416 reverses the mapping described above and depicted in FIG. 5. In response to the extracted control signal, modem system 100 may conduct the appropriate control procedure (task 418). For example, the control procedure may relate to rate renegotiation, retraining, or the like, as described above.

In summary, the present invention provides an improved control signal technique for use in a fully digital data communication system. Another aspect of the present invention is that it enables the calling and answer modems in a modem system to determine whether a fully digital communication channel has been established. The preferred inband digital control channel can be easily implemented by leveraging existing V.90 digital modem technology. Furthermore, the inband digital control technique can be utilized to facilitate the monitoring and maintenance of digital frame synchronization during the transmission of data.

The present invention has been described above with reference to a preferred embodiment. However, those skilled in the art will recognize that changes and modifications may be made to the preferred embodiment without departing from the scope of the present invention. For example, although the preferred embodiment has been described in the context of a V.90 modem system that follows the V.8 start-up procedures, the present invention is not limited to such systems. In addition, the various processing tasks described herein may not necessarily have to be performed in the specific order shown and such processes (or portions thereof) may be performed in conjunction with a more complex overall processing scheme. These and other changes or modifications are intended to be included within the scope of the present invention, as expressed in the following claims.

What is claimed is:

1. A data communication method for providing control signals between a first modem device and a second modem device operatively coupled together with a fully digital communication channel established therebetween, said method comprising the steps of:

establishing a communication session between said first and second modem devices;

executing, during said communication session, an inband signaling routine between said first and second modem devices; and conducting a control procedure during said communication session, said conducting step being performed in response to a control signal associated with said inband signaling routine, wherein:

encoded data is transmitted from said first modem device to said second modem device in the form of a plurality of digital codewords during said communication session;

said control signal comprises a plurality of control bits; and said executing step comprises the steps of:

transmitting said plurality of control bits in a plurality of periodic codewords of said plurality of digital codewords, and wherein each of said plurality of digital codewords is formed from a number of bits; and said transmitting step transmits said control bits in a consistent bit position associated with said plurality of periodic digital codewords;

extracting said control bits from said periodic ones of said plurality of digital codewords to thereby obtain a plurality of extracted control bits; and analyzing said extracted control bits to recover said control signal.

2. A data communication method for providing control signals between a first modem device and a second modem device operatively coupled together with a fully digital communication channel established therebetween, said method comprising the steps of:

establishing a communication session between said first and second modem devices;

executing, during said communication session, an inband signaling routine between said first and second modem devices; and conducting a control procedure during said communication session, said conducting step being performed in response to a control signal associated with said inband signaling routine, wherein:

encoded data is transmitted from said first modem device to said second modem device in the form of a plurality of digital codewords during said communication session;

said control signal comprises a plurality of control bits; and said executing step comprises the step of transmitting said plurality of control bits in a plurality of periodic codewords of said plurality of digital codewords, and wherein each of said plurality of digital codewords is formed from a number of bits; and said transmitting step transmits said control bits in a consistent bit position associated with said plurality of periodic digital codewords;

wherein said transmitting step transmits said control bits in the most significant bit position associated with said plurality of periodic digital codewords.

3. A data communication method for providing control signals between a first digital modem device and a second digital modem device operatively coupled together with a fully digital communication channel established therebetween, said method comprising the steps of:

establishing a communication session between said first and second modem devices, during which encoded data is transmitted from said first modem device to said second modem device in the form of a plurality of digital codewords;

replacing a number of bits from said plurality of digital codewords with a corresponding number of control bits to thereby create an inband control signal, wherein said inband control signal comprises a predetermined header pattern and a packet length indicator, and wherein said replacing step replaces bits from every N digital codeword;

repeatedly transmitting said predetermined header pattern and said packet length indicator as part of said inband control signal, said packet length indicator identifying a number (n) of packets; and transmitting n packets containing control data when n is a nonzero number.

4. A data communication method for providing control signals between a first digital modem device and a second digital modem device operatively coupled together with a fully digital communication channel established therebetween, said method comprising the steps of:

establishing a communication session between said first and second modem devices, during which encoded data is transmitted from said first modem device to said second modem device in the form of a plurality of digital codewords;

replacing a number of bits from said plurality of digital codewords with a corresponding number of control bits to thereby create an inband control signal, wherein said inband control signal comprises a predetermined header pattern and a packet length, and wherein said replacing step replaces bits from every N digital codeword;

transmitting said inband control signal from said first modem device to said second modem device;

receiving said inband control signal at said second modem device; and monitoring digital frame synchronization between said modem devices in response to said predetermined header pattern to detect a digital frame slippage, said monitoring step being performed by said second modem device.

5. A method of detecting a digital frame slippage for use during a digital communication session, said method comprising:

establishing said digital communication session;

encoding data in the form of a plurality of digital codewords;

selecting a plurality of periodic digital codewords of said plurality of digital codewords;

replacing a number of bits from said plurality of periodic digital codewords with a corresponding number of bits to generate a predetermined pattern; and transmitting said digital codewords to enable a remote device to detect said digital frame slippage by monitoring said predetermined pattern.

6. The method of claim 5, wherein said predetermined pattern is a header preceding control data.

7. The method of claim 6 further comprising:

replacing a number of bits from said plurality of periodic digital codewords with a corresponding number of bits to generate said control data; and transmitting said digital codewords to control said remote device.

8. The method of claim 7, wherein said control data indicates a retrain.

9. The method of claim 7, wherein said control data indicates a cleardown.

10. The method of claim 5, wherein each said digital codeword includes a plurality of bits, and wherein said replacing replaces the most significant bit of each said periodic digital codeword.

11. A communication device for exchanging digital frames with a remote device through a digital communication channel, said device comprising:

a processor capable of encoding data in the form of a plurality of digital codewords, said plurality of digital codewords including a plurality of periodic digital codewords, wherein said processor replaces a number of bits from said plurality of periodic digital codewords with a corresponding number of bits to generate a predetermined pattern; and a transmitter capable of transmitting said digital codewords to enable said remote device to detect a digital frame slippage by monitoring said predetermined pattern.

12. The device of claim 11, wherein said predetermined pattern is a header preceding control data.

13. The device of claim 12, wherein said processor further replaces a number of bits from said plurality of periodic digital codewords with a corresponding number of bits to generate said control data, and said transmitter transmits said digital codewords to control said remote device.

14. The device of claim 13, wherein said control data indicates a retrain.

15. The device of claim 13, wherein said control data indicates a cleardown.

16. The device of claim 11, wherein each said digital codeword includes a plurality of bits, and wherein said processor replaces the most significant bit of each said periodic digital codeword.

17. A computer program product for detecting a digital frame slippage for use during a digital communication session, said computer program product comprising:

code for establishing said digital communication session;

code for encoding data in the form of a plurality of digital codewords;

code for selecting a plurality of periodic digital codewords of said plurality of digital codewords;

code for replacing a number of bits from said plurality of periodic digital codewords with a corresponding number of bits to generate a predetermined pattern; and code for transmitting said digital codewords to enable a remote device to detect said digital frame slippage by monitoring said predetermined pattern.

18. The computer program product of claim 17, wherein said predetermined pattern is a header preceding control data.

19. The computer program product of claim 18 further comprising:

code for replacing a number of bits from said plurality of periodic digital codewords with a corresponding number of bits to generate said control data; and code for transmitting said digital codewords to control said remote device.

20. The computer program product of claim 19, wherein said control data indicates a retrain.

21. The computer program product of claim 19, wherein said control data indicates a cleardown.

22. The computer program product of claim 17, wherein each said digital codeword includes a plurality of bits, and wherein said code for replacing replaces the most significant bit of each said periodic digital codeword.

* * * * *